US012372382B2

(12) United States Patent
Lopez Jauregui

(10) Patent No.: US 12,372,382 B2
(45) Date of Patent: Jul. 29, 2025

(54) MAGNETOSTRICTIVE EMAT FOR IN-MOTION INSPECTION OF RAILROAD WHEELS

(71) Applicant: Borja Lopez Jauregui, Lynchburg, VA (US)

(72) Inventor: Borja Lopez Jauregui, Lynchburg, VA (US)

(73) Assignee: Innerspec Technologies, Forest, VA (US)

( * ) Notice: Subject to any disclaimer, the term of this patent is extended or adjusted under 35 U.S.C. 154(b) by 564 days.

(21) Appl. No.: 17/902,068

(22) Filed: Sep. 2, 2022

(65) Prior Publication Data
US 2024/0077340 A1    Mar. 7, 2024

(51) Int. Cl.
*G01D 5/48* (2006.01)
*B61K 9/12* (2006.01)
*B61L 27/57* (2022.01)

(52) U.S. Cl.
CPC ............... *G01D 5/485* (2013.01); *B61K 9/12* (2013.01); *B61L 27/57* (2022.01)

(58) Field of Classification Search
CPC ............ B61L 27/57; B61K 9/12; G01D 5/485
See application file for complete search history.

(56) References Cited

U.S. PATENT DOCUMENTS

| | | | | |
|---|---|---|---|---|
| 8,511,165 | B2* | 8/2013 | Lopez Jauregui | G01N 29/07 381/338 |
| 8,818,585 | B2* | 8/2014 | Bartonek | B61L 27/57 701/19 |
| 8,925,873 | B2* | 1/2015 | Gamache | B61K 9/12 356/3.01 |
| 9,340,219 | B2* | 5/2016 | Gamache | B61K 9/12 |
| 10,124,819 | B2* | 11/2018 | Ghosh | G01L 5/0052 |
| 11,320,371 | B2* | 5/2022 | Mian | B61K 9/12 |
| 11,448,620 | B2* | 9/2022 | Lopez Jauregui | G01N 29/225 |

(Continued)

FOREIGN PATENT DOCUMENTS

| | | | | |
|---|---|---|---|---|
| CN | 107719413 A | * | 2/2018 | ............... B61K 9/12 |
| CN | 109373959 A | * | 2/2019 | ............... B61K 9/12 |

(Continued)

*Primary Examiner* — Paul N Dickson
*Assistant Examiner* — Maxwell L Meshaka

(57) ABSTRACT

This disclosure relates to the inspection of train wheels while mounted on a train that is moving on a railroad track. A magnetostrictive EMAT transducer is built using an RF Coil, a static biasing magnetic field, and a strip of highly magnetostrictive material. This magnetostrictive EMAT transducer is subsequently attached to a rail on the track so the wheel tread of the moving train can contact and apply downward pressure on the magnetostrictive EMAT transducer. A mechanism under the transducer provides enough counterforce to pressure-couple the transducer with the tread of the wheel. Once the transducer is ultrasonically coupled with the wheel, an ultrasonic instrument sends a pulse to the transducer generating a Shear Horizontal wave that travels circumferentially following the tread body. The Shear Horizontal wave generated with this magnetostrictive strip EMAT transducer penetrates deep into the wheel tread and permits detection of both surface and internal defects.

10 Claims, 3 Drawing Sheets

(56) References Cited

U.S. PATENT DOCUMENTS

| | | | | |
|---|---|---|---|---|
| 11,731,673 | B1* | 8/2023 | Buchanan | B61F 15/20 702/35 |
| 12,145,639 | B2* | 11/2024 | Buchanan | G01M 17/10 |
| 12,184,258 | B2* | 12/2024 | Lopez Jauregui | H03H 7/38 |
| 2012/0103097 | A1* | 5/2012 | Lopez Jauregui | G01N 29/2412 73/643 |
| 2012/0240681 | A1* | 9/2012 | Lopez Jauregui | G01N 29/4445 73/643 |
| 2013/0313372 | A1* | 11/2013 | Gamache | B61K 9/12 246/169 D |
| 2014/0110534 | A1* | 4/2014 | Bartonek | B61K 9/12 246/169 R |
| 2015/0115109 | A1* | 4/2015 | Gamache | B61K 9/12 246/169 D |
| 2018/0037240 | A1* | 2/2018 | Ghosh | B61K 9/12 |
| 2020/0393417 | A1* | 12/2020 | Lopez Jauregui | G01N 29/11 |
| 2020/0408682 | A1* | 12/2020 | Mian | G01N 21/47 |
| 2021/0140929 | A1* | 5/2021 | Lopez Jauregui | G01N 29/2412 |
| 2022/0111417 | A1* | 4/2022 | Lopez Jauregui | G01N 29/043 |
| 2022/0411237 | A1* | 12/2022 | Voss | G01D 5/145 |
| 2024/0077340 | A1* | 3/2024 | Lopez Jauregui | G01D 5/485 |
| 2024/0109565 | A1* | 4/2024 | Buchanan | G01M 13/045 |
| 2024/0125742 | A1* | 4/2024 | Lopez Jauregui | G01N 29/46 |
| 2024/0146278 | A1* | 5/2024 | Lopez Jauregui | H03H 7/38 |
| 2024/0280358 | A1* | 8/2024 | Zhou | G01B 5/201 |
| 2025/0145188 | A1* | 5/2025 | Buchanan | B61F 15/20 |

FOREIGN PATENT DOCUMENTS

| | | | | |
|---|---|---|---|---|
| CN | 109668515 | A * | 4/2019 | B61K 9/12 |
| CN | 116202467 | A * | 6/2023 | |
| DE | 10220093 | A1 * | 11/2003 | F16C 29/005 |

* cited by examiner

MAGNETOSTRICTIVE EMAT FOR IN-MOTION INSPECTION OF RAILROAD WHEELS

BACKGROUND OF THE INVENTION

The present invention relates generally to the field of non-destructive testing and in particular to Electromagnetic Acoustic Transducer (EMAT).

The heavy loads and speed of a train place tremendous stress on its wheels which can result in the development of internal cracks. As these cracks grow, they propagate through the tread and can cause a catastrophic failure of the wheel with potential grave consequences for people and equipment.

Over the years, the industry has developed and implemented systems to find broken wheels based on visual and vibration analysis, but these techniques only detect the damage when it has already resulted in a broken wheel.

In the late 90s and early 2000s, the first systems were introduced to detect defects on the wheels of a moving train using ultrasonic surface waves (a.k.a. Rayleigh waves) generated with either piezoelectric transducers or EMAT. These guided waves propagate circumferentially following the surface of the wheel tread, and reflect back when a discontinuity is encountered. This particular guided wave mode has important practical limitations which hinder the performance of these systems in the field.

This disclosure introduces a novel ultrasonic technique using a Shear Horizontal EMAT guided wave transducer that overcomes known limitations of the surface wave technique, and permits inspecting the tread of a moving train wheel with far superior detection capabilities.

SUMMARY OF THE INVENTION

In some embodiments, a non-destructive inspection system includes a magnetostrictive EMAT transducer comprising at least one biasing static magnetic field, an RF coil, and a thin strip of highly magnetostrictive material on top of the RF coil. An optional layer of malleable material can be adhered over the magnetostrictive strip to enhance coupling with the railroad wheel.

This magnetostrictive strip EMAT transducer is attached to a railroad track so the wheel tread of the moving train can contact and transfer some of its weight on the strip. A counterforce mechanism under the transducer pushes upwards with enough force to ultrasonically couple the transducer with the tread of the wheel.

As the transducer is pressure-coupled onto the wheel, an ultrasonic instrument sends a pulse to the transducer generating a Shear Horizontal wave on the tread of the wheel, which travels circumferentially following the tread body.

Surface and internal discontinuities in the tread rim will generate reflections and/or attenuation in the propagation of the wave, which can be detected by the ultrasonic instrument to alert operators before the wheel fails.

DETAILED DESCRIPTION OF THE INVENTION

Figure 1:
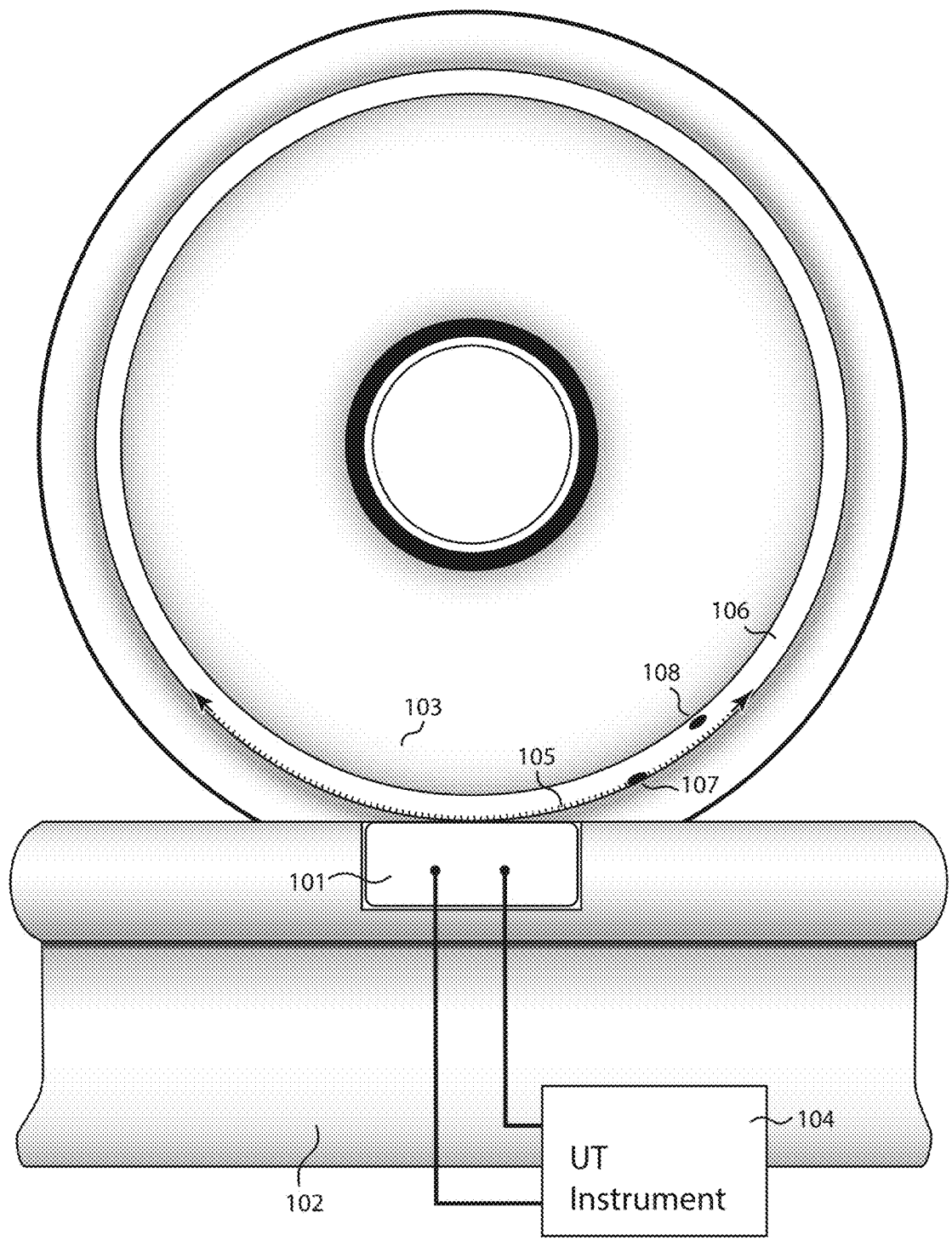
FIG. 1 shows a prior art EMAT surface wave transducer that generates a surface wave as the wheel is positioned on top of the transducer. The wave only penetrates one wavelength in the material and only surface defects can be detected.

The following detailed description is of the best currently contemplated modes of carrying out exemplary embodiments of the invention. The description is not to be taken in a limiting sense but is made merely for the purpose of illustrating the general principles of the invention since the scope of the invention is best defined by the appended claims.

The present invention relates to an Electro Magnetic Acoustic Transducer (EMAT) transducer that generates Shear Horizontal guided waves on a magnetostrictive strip layer on top of said transducer. The strip is pressure-coupled onto a moving train wheel to provide inspection of the tread of the train wheel.

Ultrasonic waves can be divided into bulk waves and guided waves. The most common ultrasonic techniques involve the use of bulk waves in which the boundaries of the structure are just reflectors that do not fundamentally change the mode of propagation. Ultrasonic guided waves are formed from the constructive interference of ultrasonic bulk waves as they interact with the boundaries of the structure in which they propagate. One of the most relevant benefits of guided waves is their ability to efficiently propagate over long distances following the boundaries of the structure where they are generated.

The most common guided wave modes are surface waves (a.k.a. Rayleigh waves), Lamb waves, and Shear Horizontal waves.

As its name indicates, surface waves follow the surface boundary of the structure where they are generated. On U.S. Pat. No. 6,401,044B1, Alberto Ibanez et al make the first reference to using surface waves for inspection of train wheels. A few years later on KR20040103575A, Kang Sihong et al introduce EMAT-generated surface waves for inspection of train wheels. More recently on CN2919190Y, Wang Li et al discloses the use of an electromagnet in lieu of a permanent magnet for this wave mode, and on CN102564363B, Wang Shujuan et al introduce further refinements to the surface wave technique.

However, whether generated with piezoelectric transducers or EMAT, surface waves have important limitations associated with particle motion and wave penetration.

Surface waves follow an elliptical pattern with both a horizontal and a vertical, out-of-plane motion which makes them highly susceptible to the conditions of the surface of the structure in which they propagate. Water, dirt, rust, or contaminants on the surface of the wheel can scatter and attenuate the wave thus reducing the range and ability to find defects. In the case of railroad wheels, an additional problem is that the top surface frequently exhibits a thin layer of cold-worked material that can also scatter and attenuate the energy of the surface wave, significantly reducing its range, and rendering the technique ineffectual for a significant percentage of rolling stock.

The other main limitation of surface waves is penetration in the component. While the particle motion is equivalent to one wavelength, over 95% of the energy is confined to the top 1-3 mm of the surface which limits practical defect detection to the topmost surface of the wheel tread.

In the case of Lamb waves, while they offer the possibility for greater penetration depth, the particle motion is identical to surface waves, and experiments show that they do not propagate effectively on the tread of standard railroad wheels.

Shear Horizontal waves offer much better potential for the inspection of train wheels. First, the particle motion is horizontal to the entry plane and thus parallel to the surface of the wheel. The lack of a vertical out-of-plane component makes this wave less sensitive to surface conditions including material changes in the cold-worked surface area. Second, Shear Horizontal waves penetrate deeper and permit an effective inspection as deep as 25 mm inside the wheel tread. Detection of internal defects is particularly relevant since the stress cracks typically start deep into the wheel tread, and by the time they reach the surface, there is a significant chance of having enough damage to cause a spall, and subsequent catastrophic failure of the wheel.

The challenges of generating Shear Horizontal energy generated directly into the wheel material are the complexity of the construction and signal strength. Lorentz force Shear Horizontal EMAT sensors require using periodic permanent magnets which are large, inefficient, and exhibit poor detection capabilities. Pulsed electromagnets can be used to generate Shear Horizontal EMAT energy using the magnetostricticion inherent in the ferrous-wheel material, but in this construction, the flange of the wheel interferes with the pole of the magnet, which limits the sensor dimensions and practicality of this approach.

The EMAT transducer proposed in this disclosure involves generating the ultrasound on a strip of highly magnetostrictive material and using the weight of the wheel and train itself to pressure-couple the strip with the wheel. In this construction, instead of generating the ultrasonic wave directly in the wheel, the EMAT transducer generates the Shear Horizontal wave in the strip, which produces much more energy that results in far superior detection capabilities.

The strip of magnetostrictive material can be similar to the ferromagnetic material which is widely used for pipeline inspection, or made of other materials with good magnetostrictive properties.

The magnetostrictive strip Shear Horizontal EMAT transducer is attached to the railroad track and supported with an actuator or a spring mechanism that provides the counter-force to keep the transducer against the wheel with only the necessary force to provide ultrasonic coupling. The transducer can be attached to the rail itself (outer, center, or inner side) or to an adjacent structure. As the train wheel rolls over the transducer, the weight of the train and wheel presses on the strip and compresses the spring mechanism. It is estimated that the pressure to ultrasonically couple the strip with the wheel is between 25 and 50 PSI.

Once coupled with the wheel, an ultrasonic instrument pulses the transducer, which generates a Shear Horizontal wave that travels around the wheel tread following its contour. Surface and internal defects reflect back energy that can be measured by the ultrasonic instrument. Additionally, the ultrasonic instrument can measure the amount of energy that goes full circle around the wheel, and use this information to infer the presence of defects based on the attenuation of this energy.

Another intrinsic advantage of the magnetostrictive strip EMAT transducer is that this construction can generate up to 40 dB more signal-to-noise than a standard Lorentz-force EMAT transducer that generates Shear Horizontal waves directly on the wheel material.

FIG. 1 shows a prior art EMAT transducer that generates a surface wave for inspection of a train wheel. The EMAT surface wave transducer (101) is attached to the rail (102) under the passing train. When the wheel (103) rolls on top of the transducer, an ultrasonic instrument (104) generates a pulse that the transducer converts into the surface wave, which travels around the circumference of the wheel in both directions. The surface wave penetrates one wavelength (105) into the wheel tread (106) and it can interact with and detect discontinuities next to its surface (107) but cannot interact with and detect internal discontinuities (108).

Figure 2:
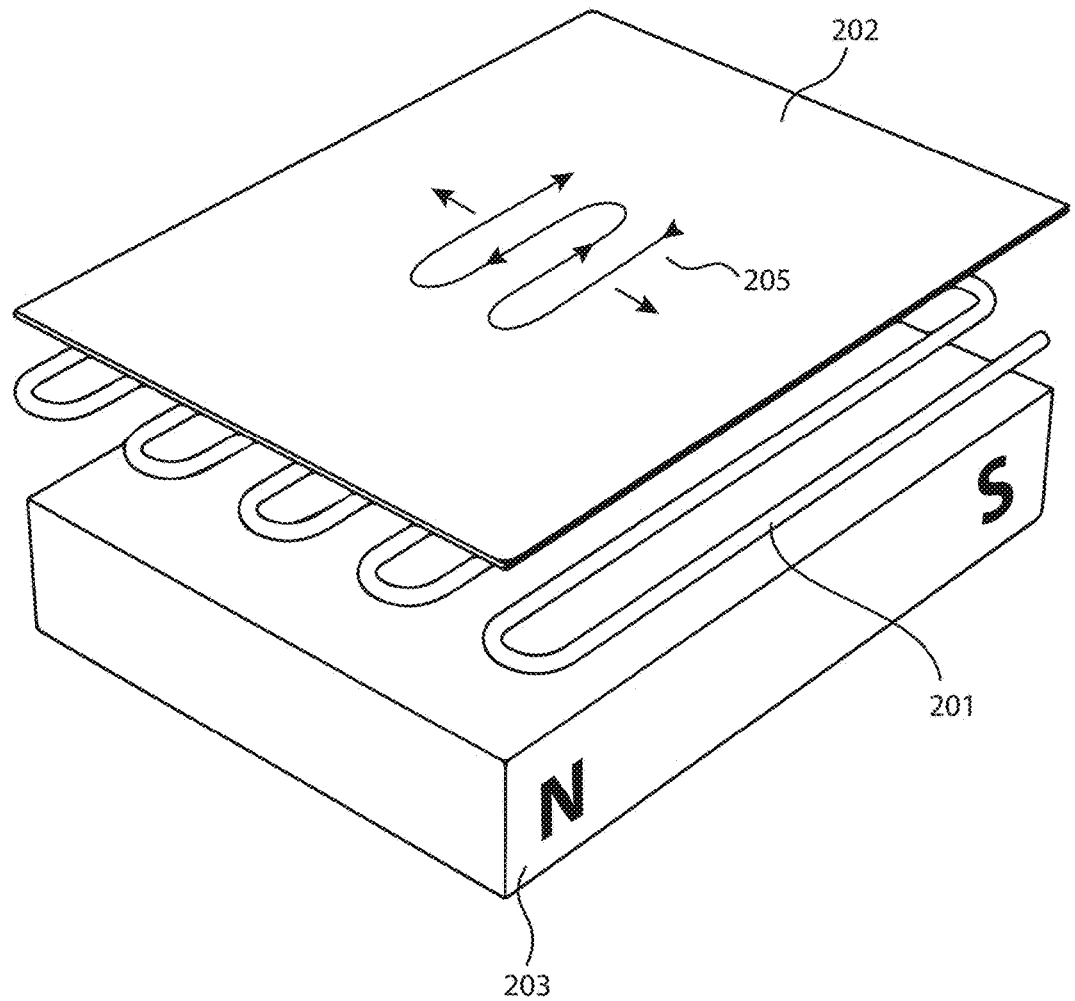
FIG. 2 shows a standard construction of the Shear Horizontal magnetostrictive strip EMAT transducer comprising an RF Coil, a static biasing field, and the magnetostrictive strip.

FIG. 2 shows a standard construction for a magnetostrictive EMAT transducer when using a magnetostrictive strip. An RF Coil (201) generates eddy currents on the magnetostrictive strip (202) and one or more magnets (203) are used to create a biasing field. The vectorial resultant of the magnetic and electrical fields generate a Shear Horizontal wave (205) on said magnetostrictive strip.

Figure 3:
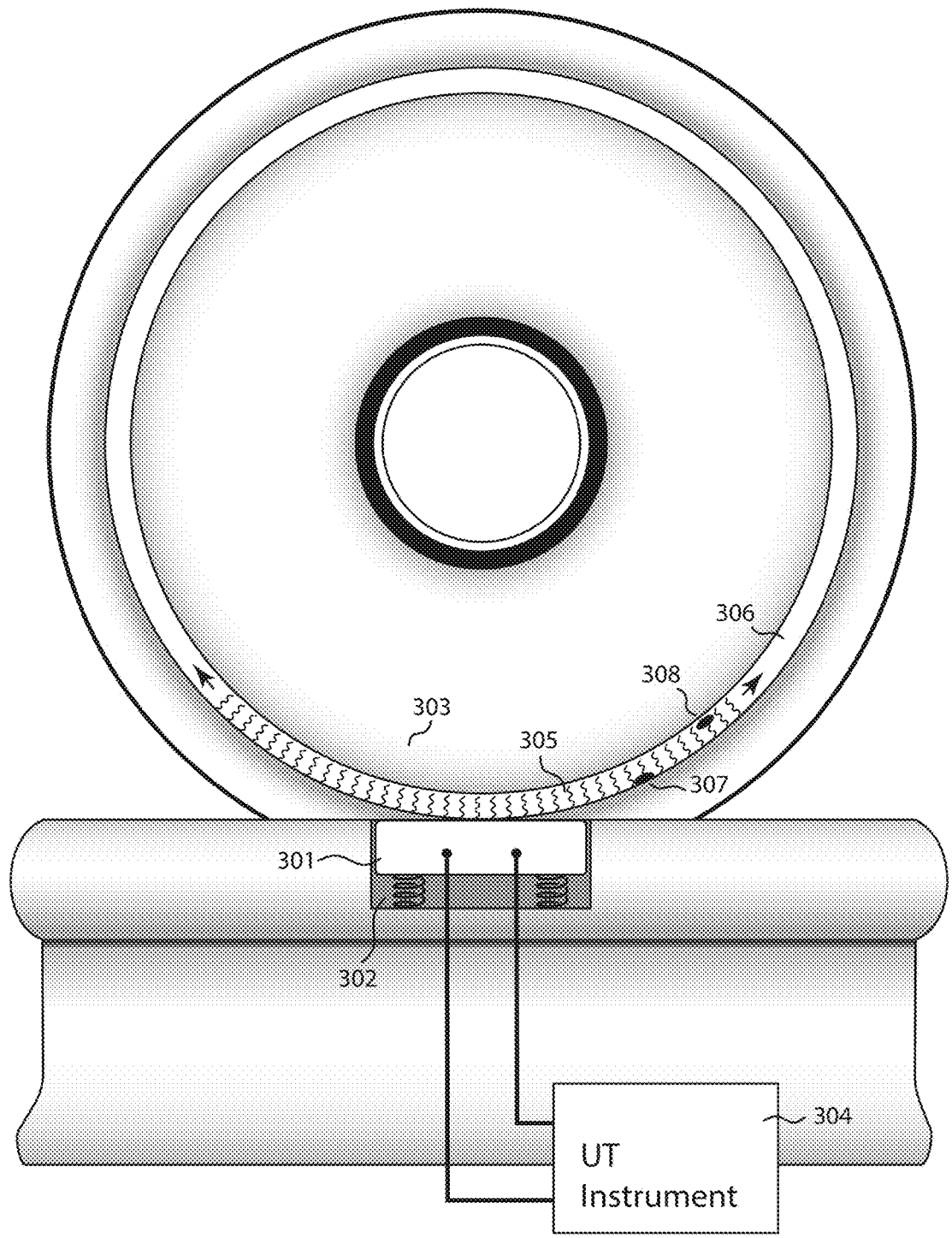
FIG. 3 shows the magnetostrictive strip EMAT transducer attached to a rail on the track. The transducer is supported by a mechanism that pushes upwards with enough pressure to ultrasonically couple the transducer to the wheel. As the train wheel moves over the transducer, the weight of the wheel and train press down on the strip providing the pressure to couple it with the wheel. Once coupled, the instrument pulses, and the Shear Horizontal wave travels circumferentially around the wheel permitting the detection of surface and internal defects in the tread body.

FIG. 3 shows the transducer from FIG. 2 attached to a rail. The magnetostrictive EMAT transducer (301) is mounted on a spring mechanism (302) that provides a counter-force against the weight of the wheel (303) as it rolls on top of said transducer. The weight of the wheel and train presses down on the transducer, and the spring pushes back with enough counter pressure to ultrasonically couple the magnetostrictive strip to the tread of the moving wheel. As the wheel rolls over the transducer, an ultrasonic instrument (304) generates a pulse that the transducer converts into the Shear Horizontal wave. The Shear Horizontal wave (305) penetrates deep into the tread (306) while traveling circumferentially around the wheel in both directions. The Shear Horizontal wave will interact with and detect discontinuities both on the surface (307) and deeper in the wheel tread body (308).

What is claimed is:

1. A system for detecting surface and internal defects on the tread of a rail wheel riding on a railroad track comprising:
    a magnetostrictive EMAT transducer that generates Shear Horizontal waves by means of a magnetostrictive strip;
    an attachment that connects the magnetostrictive EMAT transducer to a railroad track so the tread of the wheel of a moving train makes contact and applies downward pressure on the magnetostrictive strip so as to momentarily pressure couple the strip to the wheel of the train as it rolls on the track using at least one spring;
    an ultrasonic instrument connected to the magnetostrictive EMAT transducer to pulse it and receive and record the ultrasonic signals.

2. The system of claim 1, wherein the magnetostrictive EMAT transducer comprises the following elements:
    a strip section of magnetostrictive material positioned on the surface of the transducer that contacts the wheel;
    at least one RF Coil that generates eddy currents on the strip section of magnetostrictive material;
    a static biasing magnetic field which in combination with the eddy currents generated by the RF Coil induces ultrasonic Shear Horizontal waves on the strip section of magnetostrictive material.

3. The system of claim 1, wherein the magnetostrictive EMAT transducer is mounted on an actuator that can be adjusted to provide the desired amount of counter pressure to mechanically couple the ultrasonic energy from the transducer to the wheel.

4. The system of claim 2, wherein the strip section of magnetostrictive material is made out of Nickel, Cobalt, alloys of FeCo, alloys of FeNi, alloys of FeAl, alloys of FeGa, Terfenol-D, or another material that exhibits high magnetostriction.

5. The system of claim 2, wherein a thin layer of malleable material is adhered on top of the strip section of magnetostrictive material to enhance coupling with the wheel tread.

6. The system of claim 2, wherein the static biasing magnetic field is generated with one or more permanent magnets.

7. The system of claim 2, wherein the static biasing magnetic field is generated with one or more electromagnets.

8. The system of claim 2, wherein the strip section of magnetostrictive material has been permanently magnetized and does not require a permanent magnet or electromagnet to create the static biasing magnetic field.

9. The system of claim 2, wherein the RF coil used for transmitting the Shear Horizontal waves is the same as the one receiving the Shear Horizontal waves in a pulse-echo configuration.

10. The system of claim 2, wherein the RF coil used for transmitting the Shear Horizontal waves is separate from the one receiving the Shear Horizontal waves in a pitch-catch configuration.

* * * * *